US012210952B2

(12) United States Patent
Kwon et al.

(10) Patent No.: US 12,210,952 B2
(45) Date of Patent: Jan. 28, 2025

(54) REORGANIZABLE DATA PROCESSING ARRAY FOR NEURAL NETWORK COMPUTING

(71) Applicant: ELECTRONICS AND TELECOMMUNICATIONS RESEARCH INSTITUTE, Daejeon (KR)

(72) Inventors: Young-Su Kwon, Daejeon (KR); Chan Kim, Daejeon (KR); Hyun Mi Kim, Daejeon (KR); Jeongmin Yang, Busan (KR); Chun-Gi Lyuh, Daejeon (KR); Jaehoon Chung, Daejeon (KR); Yong Cheol Peter Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1287 days.

(21) Appl. No.: 16/201,871

(22) Filed: Nov. 27, 2018

(65) Prior Publication Data
US 2019/0164035 A1      May 30, 2019

(30) Foreign Application Priority Data

Nov. 29, 2017   (KR) .................. 10-2017-0162170
Oct. 26, 2018   (KR) .................. 10-2018-0129313

(51) Int. Cl.
*G06N 3/04*          (2023.01)
(52) U.S. Cl.
CPC ..................... *G06N 3/04* (2013.01)
(58) Field of Classification Search
CPC ....................................................... G06N 3/04
See application file for complete search history.

(56) References Cited

U.S. PATENT DOCUMENTS 4,942,517 A  *  7/1990  Cok ................. G06F 15/8023
                                                    706/41
5,524,175 A  *  6/1996  Sato ................... G06N 3/063
                                                    706/41
(Continued)

FOREIGN PATENT DOCUMENTS

KR       10-0445264 B1      8/2004
KR       10-1701250 B1      2/2017
WO       WO20160186801      11/2016

OTHER PUBLICATIONS

Sawada et al. TrueNorth Ecosystem for Brain-Inspired Computing: Scalable Systems, Software, and Applications. SC16; Salt Lake City, Utah, USA; Nov. 2016 (Year: 2016).*

(Continued)

*Primary Examiner* — Alexey Shmatov
*Assistant Examiner* — Robert Bejcek, II

(57) ABSTRACT

A reorganizable neural network computing device is provided. The computing device includes a data processing array unit including a plurality of operators disposed at locations corresponding to a row and a column. One or more chaining paths which transfer the first input data from the operator of the first row of the data processing array to the operator of the second row are optionally formed. The plurality of first data input processors of the computing device transfer the first input data for a layer of the neural network to the operators along rows of the data processing array unit, and the plurality of second data input processors of the computing device transfer the second input data to the operators along the columns of the data processing array.

16 Claims, 3 Drawing Sheets

(56) References Cited

U.S. PATENT DOCUMENTS

| | | | |
|---|---|---|---|
| 10,515,135 B1* | 12/2019 | Zejda | G06F 17/12 |
| 2012/0317062 A1 | 12/2012 | Brezzo et al. | |
| 2013/0291108 A1 | 10/2013 | Yu et al. | |
| 2015/0310311 A1* | 10/2015 | Shi | G06V 10/955 |
| | | | 382/158 |
| 2015/0379393 A1 | 12/2015 | Alvarez-Icaza Rivera et al. | |
| 2016/0155047 A1 | 6/2016 | Esser et al. | |
| 2016/0343452 A1 | 11/2016 | Ikeda et al. | |
| 2016/0364643 A1* | 12/2016 | Cruz-Albrecht | G06N 3/088 |
| 2017/0147777 A1 | 5/2017 | Kim et al. | |
| 2017/0366399 A1 | 12/2017 | Li et al. | |
| 2018/0121790 A1 | 5/2018 | Kim et al. | |
| 2019/0121734 A1* | 4/2019 | Akopyan | G11C 7/1057 |

OTHER PUBLICATIONS

Kung et al. Wavefront Array Processor: Language, Architecture, and Applications. IEEE Transactions on Computers, vol. C-31, No. 11, Nov. 1982 (Year: 1982).*

Tammemae, Kalle. Systolic arrays. System-on-Chip Architectures. 2002 (Year: 2002).*

* cited by examiner

REORGANIZABLE DATA PROCESSING ARRAY FOR NEURAL NETWORK COMPUTING

CROSS-REFERENCE TO RELATED APPLICATION

This application claims priority to and the benefit of Korean Patent Application Nos. 10-2017-0162170 filed in the Korean Intellectual Property Office on Nov. 29, 2017 and 10-2018-0129313 filed in the Korean Intellectual Property Office on Oct. 26, 2018, the entire contents of which are incorporated herein by reference.

BACKGROUND OF THE INVENTION

(a) Field of the Invention

The present invention is about neural network computing. More specifically, the present invention relates to a reorganizable neuronal network computing device that can be reorganized.

(b) Description of the Related Art

Neural networks (NN) are machine learning models that utilize one or more layers of models to produce output (e.g., classification) with received input. Some neural networks include one or more hidden layers in addition to an output layer. The output of each hidden layer is used as input to the next layer of the network, that is, the next hidden layer or output layer of the network. Each layer of the network generates output from the received input according to current values of each set of parameters.

A neural network can be implemented as hardware, but it is primarily implemented in computer software. A neural network is one in which several neurons, the basic computing unit, are connected with a weighted link, and the weighted link can adjust the weight value to adapt to a given environment.

Meanwhile, the current artificial intelligence application is a sophisticated but slow reaction service due to network connection between a server and a client. This is because the computation of a neural network, a key algorithm for deep learning, requires more than a thousand times more computing than a typical AP (application processor). In a society where the 4th industry revolution will change things, popularization of artificial intelligence service, that is, implementation of artificial intelligence computing capability on all information communication devices, is required. In order to realize 'realization' of information society by artificial intelligence, a new technology is needed to implement a large amount of computing capability required by a deep learning artificial neural network in a small semiconductor.

Techniques for implementing semiconductors for computing based on such neural networks have been researched, and many companies are developing different types of architectures. Neural networks typically require floating-point computations between 1 trillion and 100 trillion computations per second, requiring very high computing performance and requiring a very large number of computing cores to be integrated within the semiconductor. However, semiconductor manufacturing cost is high, and once it is manufactured, it cannot be changed.

Related prior art documents include U.S. Patent publication No. 2017-0366399 entitled "SYSTEMS AND METHODS FOR USER PLANE PATH SELECTION, RESELECTION AND NOTIFICATION OF USER PLANE CHANGES".

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a reorganizable neuronal network computing device having a re-organizing structure.

An exemplary embodiment of the present invention provides a computing device for performing computation on a neural network. The computing device includes a data processing array unit configured to include: a plurality of operators, wherein each operator is disposed at positions corresponding to a row and a column of the data processing array unit; a plurality of first data input processors configured to transfer first input data for a layer of the neural network to the operators along a row of the data processing array; and a plurality of second data input processors configured to transfer second input data for the layer of the neural network to the operators along a column of the data processing array unit, wherein one or more chaining paths are optionally formed to transfer the first input data from an operator of a first row of the data processing array unit to an operator of a second row.

The chaining path may be formed depending on a type of a layer of the neural network.

The chaining path may be formed when performing a computation on a fully-connected layer (FCL).

Here, a first data input processor corresponding to the first row of the data processing array unit among the plurality of first data input processors may operate only while the remaining first data input processors do not operate.

The first input data input from the first data input processor corresponding to the first row of the data processing array unit may be transferred to all of the operators of the processing array unit via chaining paths when the chaining paths are formed by two row units in the data processing array unit.

Meanwhile, a chaining path may be formed between an operator which is last disposed at an even-numbered row of the data processing array unit and an operator which is last disposed at a previous odd-numbered row of the data processing array unit.

The chaining path may be formed by a fact that the operator which is last disposed at an even-numbered row of the data processing array unit determines to receive the first input data transferred from the operator which is last disposed at a previous odd-numbered row of the data processing array unit according to an input instruction.

An operator last disposed at a row may be an operator disposed farthest from the first data input processor.

An operator which is first disposed at an even-numbered row of the data processing array unit may be configured to transfer the first input data input from a neighboring operator of the even-numbered row to an operator which is first disposed at a next odd-numbered row of the data processing array unit when a plurality of chaining paths are formed.

An operator first disposed at a row may be an operator which is disposed closest to the first data input processor.

Meanwhile, the data processing array unit may further include buffers configured to buffer the second input data and provide it to an operator of a corresponding cell, wherein the buffers are disposed at each cell which corresponds to a row and a column of the data processing array unit.

The number of the operators may be equal to the number of the buffers.

The data processing array unit may have a systolic array structure.

In addition, each operator may be configured to compute the first input data and the second input data, and accumulate and store the results of the computation.

The operator may be configured to transfer the first input data to a neighboring operator disposed at the same row or to transfer the second input data to a neighboring operator disposed at the same column.

The operator may include: a computation circuit configured to compute the first input data and the second input data; a storage unit configured to accumulate and store the computation results of the computation circuit; an input interface unit configured to transfer the first input data and the second input data to the computation circuit; and an output interface unit configured to transfer the first input data from the computation circuit and the second input data to another operator.

Another embodiment of the present invention provides a computing device for performing computation on a neural network. The computing device includes: a data processing array unit configured to include a plurality of operators, wherein each operator is disposed at positions corresponding to a row and a column of the data processing array unit and is configured to compute first input data input from a row direction and second input data input from a column direction; a plurality of first data input processors configured to transfer the first input data to the operators; and a plurality of second data input processors configured to transfer the second input data for the layer of the neural network to the operators, wherein the operator is further configured to transfer the first input data to a neighboring operator on the same row and to transfer the second input data to a neighboring operator on the same column, and an operator last disposed at a first row of the data processing array unit is configured to transfer the first input data to an operator last disposed at a second row.

An operator which is last disposed at an even-numbered row of the data processing array unit may be configured to receive the first input data from an operator which is last disposed at a previous odd-numbered row, according to an input instruction.

Each operator may be configured to compute the first input data and the second input data, accumulate and store the results of the computation, and output the cumulated computation result to the first data input processor in a row direction.

DETAILED DESCRIPTION OF THE EMBODIMENTS

Figure 1:
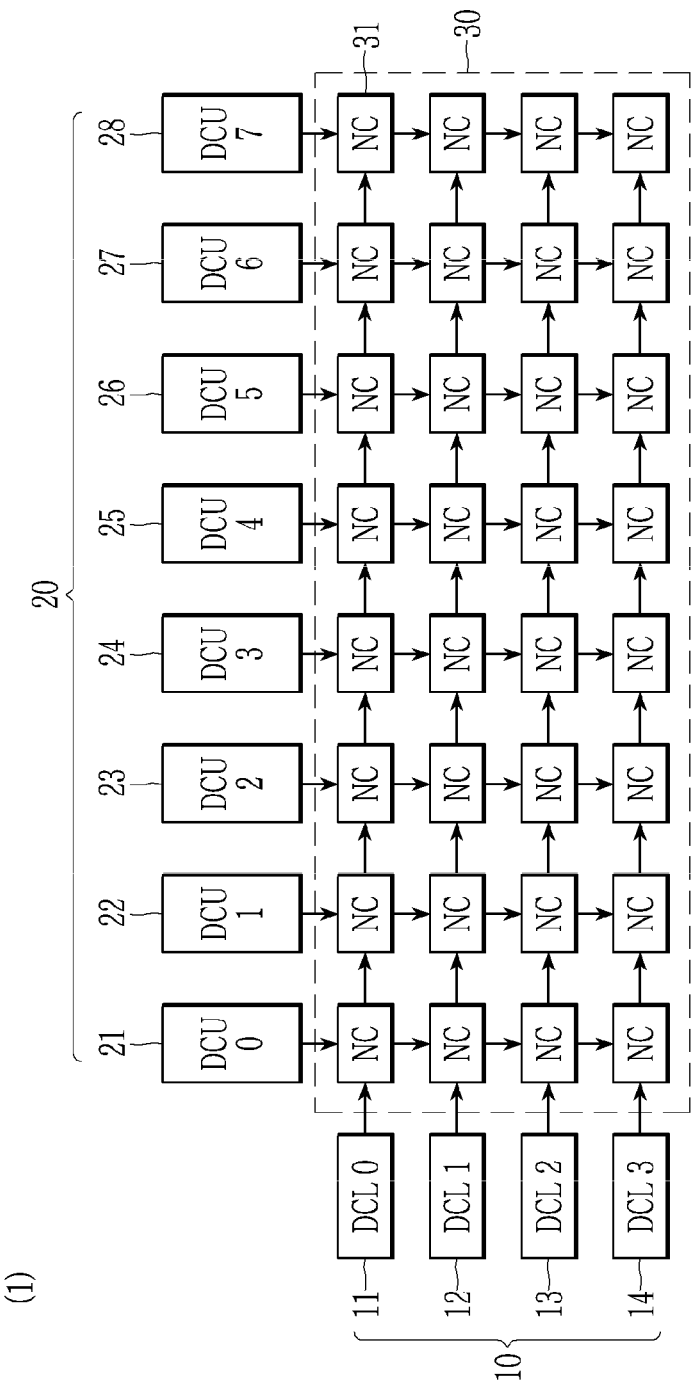
FIG. 1 shows a structure of a neural network computing device according to the first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

The expressions described in the singular of this specification may be construed as singular or plural unless explicit expressions such as "one" or "singular" are used.

Hereinafter, a reorganizable neural network computing device according to an exemplary embodiment of the present invention will be described.

An exemplary embodiment of the present invention provides a semiconductor device for neural network (NN) computing, and the semiconductor device has a structure that is capable of re-organization.

FIG. 1 shows a structure of a neural network computing device according to the first exemplary embodiment of the present invention.

The neural network computing device 1 according to the first exemplary embodiment of the present invention has a structure of a systolic array. Specifically, the neural network computing device 1 includes, as shown in FIG. 1, a plurality of data control lefters (DCL) (11, 12, 13, 14, given a representative reference numeral "10"), a plurality of data control uppers (DCU) (21, 22, . . . , 27, 28, given a representative reference numeral "20"), and a data processing array unit 30 which is disposed between the plurality of DCLs 10 and the plurality of DCUs 20.

The plurality of DCUs 20 are sequentially arranged in a first direction, and the plurality of DCLs 10 are sequentially arranged in a second direction.

The data processing array unit 30 has a two-dimensional systolic array structure including a plurality of cells, and includes a plurality of neural cores (NC) (given a representative reference numeral "31") which are disposed between the plurality of DCLs 10 arranged in the second direction and the plurality of DCUs 20 arranged in the first direction, respectively. The first dimension of the data processing array unit 30 corresponds to a row of the cells and the second dimension of the data processing array unit 30 corresponds to a column of the cells. The NCs 31 are disposed at the cell of the two-dimensional systolic array structure, respectively. Each NC 31 may include an internal register for storing the result of computation, and may also be referred to as "an operator".

The neural network computing device 1 stores data for each row of an N matrix in the DCLs 10, and stores data for each column of an M matrix in the DCUs 20 to perform N×M=Y computations. A layer may have a plurality of kernels, and the kernels may have a matrix structure. Kernel data corresponding to each kernel is provided to the DCU 20, and for example, the kernel data for the kernel A is provided to a DCU corresponding to the first column, and the kernel data for the kernel B is provided to a DCU corresponding to the second column.

The DCL 10 is configured to transmit data (also referred to as first input data) for the layers constituting the neural network along the first dimension of the data processing array unit 30. The DCU 20 is configured to transmit data (also referred to as second input data) for the layers constituting the neural network along the second dimensions of the data processing array unit 30. The DCL 10 may be referred to as "a first data input processor", and the DCU 20 may be referred to as "a second data input processor".

Each NC 31 of the data processing array unit 30 is configured to compute on data input from the DCL 10 and data input from the DCU 20 and store the result. Each NC 31 stores the computation result itself and accumulates the computation result. That is, a value obtained by adding the computation result of the current computation and the computation result stored according to the previous computation is stored as the resulting value. The resulting value stored in each NC 31 thus functions as a point in the result matrix.

Each NC 31 transfers input data to a neighboring NC. More specifically, data input from the DCL 10 is transferred along the first dimension of the data processing array unit 30, and data input from the DCU 20 is transferred along the second dimension of the data processing array unit 30. Accordingly, the data input from the DCL 10 is sequentially transferred to the NCs arranged in the first dimension of the data processing array unit 30, and the data input from the DCL 20 is sequentially transferred to the NCs arranged in the second dimension of the data processing array unit 30.

Here, for convenience, 4 DCLs 10, 8 DCUs 20, and 32 NCs 31 are used in FIG. 1, but the present invention is not limited thereto.

In the neural network computing device 1 according to the first exemplary embodiment of the present invention having such a structure, the first input data is output from the DCL 10 to the NC 31 one by one. That is, the DCL 10 outputs the first input data (e.g., data for each row of the N matrix), which has been input and then stored, in the direction (here, a first direction) of the NC 31 of the data processing array unit 30, and then the output first input data proceeds in the right direction (here, the first direction) via the NC 31 which is disposed at the corresponding row of the data processing array unit 30. At this time, the first input data is output one by one from the DCL 10 per clock cycle, and may proceed in the right direction.

The DCU 20 sequentially outputs the second input data (e.g., data for each column of the M matrix) one by one, so that the second input data proceeds in the lower direction (here, the second direction) via the NC 31 of the data processing array unit 30.

The first input data sequentially output from the DCL 10 and the second input data sequentially output from the DCU 20 are computed by each NC 31 of the data processing array unit 30, and the computation result is stored in the corresponding NC 31. Specifically, the first input data and the second input data are processed by NC 31, for example, multiplied and accumulated, and the result data is stored in a register inside the NC 31.

The result data (also referred to as accumulated data) stored in each NC 31 may be sequentially output to the DCL 10 after all data computations have been performed, for instance. The result data output to the DCL 10 may be stored in an external memory (not shown) via an on-chip memory bus (not shown).

Through the neural network computing device 1 according to the first exemplary embodiment of the present invention, the matrix computation for the neural network can be performed efficiently at a high speed.

On the other hand, the size of the matrix data for the matrix computation varies depending on the type of the layer. In the case of the convolution layer, as shown in FIG. 1, both the DCLs and the DCUs are used for computation of data input in the first direction and the second direction, but only one DCL is used for a fully-connected layer (FCL). When performing a computation for the FCL using the neural network computing device 1 having the structure of FIG. 1, only one DCL (for example, a DCL 0 in FIG. 1) disposed at one row and a plurality of NCs disposed at the one row are used and the remaining DCLs (e.g., DCL1~DCL3) and the NCs corresponding to these rows are not used. Thus, some NCs may be wasted, thereby deteriorating the utilization rate of the neural network computing device 1.

The second exemplary embodiment of the present invention provides a network computing device having a structure that is capable of re-organization according to a neural network.

Figure 2:
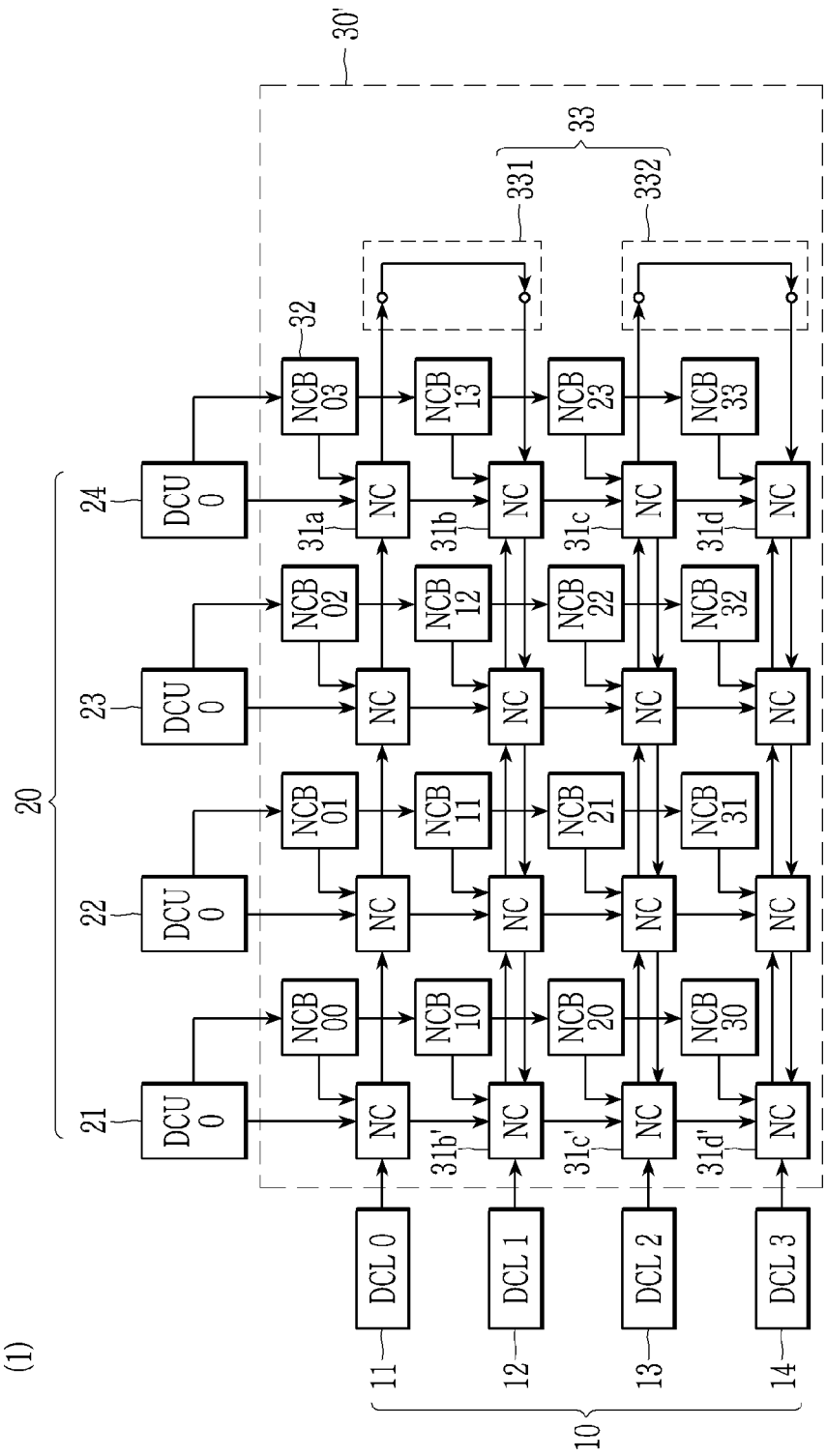
FIG. 2 shows a structure of a neural network computing device according to the second exemplary embodiment of the present invention.

FIG. 2 shows the structure of a neural network computing device according to the second exemplary embodiment of the present invention.

The neural network computing device 1 according to the second exemplary embodiment of the present invention has a structure of a systolic array. Specifically, the neural network computing device 1 includes, as shown in FIG. 2, a plurality of DCLs (11, 12, 13, 14, given a representative reference numeral "10"), a plurality of DCUs (21, 22, 23, 24, given a representative reference numeral "20") and a data processing array unit 30' which is disposed between the plurality of DCLs 10 and the plurality of DCUs 20. The plurality of DCUs 20 are sequentially arranged in a first direction, and the plurality of DCLs 10 are sequentially arranged in a second direction. Here, a detailed description is omitted for the same portion as the first exemplary embodiment.

The data processing array unit 30' has a two-dimensional systolic array structure including a plurality of cells, and includes a plurality of NCs (given a representative reference numeral "31") which are disposed between the plurality of DCLs 10 arranged in the second direction and the plurality of DCUs 20 arranged in the first direction, respectively. The data processing array unit 30 may further include a neural core buffer (NCB) (given a representative reference numeral "32") corresponding to each NC.

The first dimension of the data processing array unit 30' corresponds to the rows of the cells and the second dimensions of the data processing array unit 30 corresponds to the columns of the cells. The NCs 31 are disposed at the cells of the two-dimensional systolic array structure, respectively, and the NCB 32 is disposed adjacent to each NC 31. The number of NCBs 32 may be equal to the number of NCs 31.

Each NC 31 is configured to compute on data input from the DCL 10 and data input from the DCU 20, and store and accumulate the computation result. In addition, each NC 31 is configured to compute on data input from a corresponding NCB 32 and the data input from the DCL 10, and store and accumulate the computation result.

The DCL 10 is configured to transfer data (first input data) for the layers constituting the neural network along the first dimension of the data processing array unit 30. The DCU 20 is configured to transfer data (second input data) for the layers constituting the neural network along the second dimensions of the data processing array unit 30. Particularly, in the second exemplary embodiment of the present invention, the DCU 20 outputs the second input data to the NC 31 disposed at the corresponding column or to the NCB 32 disposed at the corresponding column, so that the second input data is transferred along the second dimensions of the data processing array unit 30. The NCB 32 is configured to buffer the data provided from the DCU 20 and transfer the buffered data to the neighboring NC 31.

When the computation of N×M=Y is performed on the FCL neural network in the neural network computing device 1, the number of rows (N (r)) is 1, and the number of columns (N (c)) is a large number of 16~1024. Also, the number of rows (M (r)) and the number of columns (M (c)) in the M matrix are large numbers, of 16~1024. In this case, since the number of kernels corresponding to the M (c) is increased while the N (r) is 1, the data (the first input data) for the N matrix is stored in one DCL (e.g., DCL0) and the data (the second input data) corresponding to each kernel of the M (c) is stored in the NCB 32.

In the case of FCL, the size of the NCB 32 does not have to be as large as the size of the DCU 20, as data is not reused, and for example, it may be sized to store eight 16-bit data. The data stored in the NCB 32 may be data supplied from an external on-chip memory. For example, data (second input data) corresponding to the M (c) for the FCL supplied from an external on-chip memory may be buffered in the NCB 32 through the DCU 20 and then provided to the NC 31. Alternatively, data corresponding respectively to the M (c) may be provided to the NC 31 through the DCU 20, or buffered to the NCB 32 via the DCU 20 and then provided to the NC 31. It is difficult for data to be transferred along second dimensions while the data is being scanned at once in the DCU 20, and transmission speed may be slower. However, transmission speed delay can be eliminated by using the NCB 32.

In this data processing array unit 30', unlike the first exemplary embodiment, a chaining path (given a representative reference numeral "33") may be formed by units for the plurality of NCs 31, which are arranged in the first and second dimensions, so that reorganization is possible in the second exemplary embodiment according to the present invention. For example, a chaining path may be selectively formed for each of two row units.

The chaining path 33 may be selectively formed to transfer data from the NC of the odd-numbered rows to the NC of the even-numbered rows. Specifically, the chaining path 33 is formed between the NCs disposed at the even-numbered (e.g., i-th, where i is a positive even number) row and the NC disposed at the previous odd-numbered row (e.g., i–1th). In particular, the NCs which are last disposed at the even-numbered rows and NCs which are last disposed at the previous odd-numbered rows are selectively connected through the chaining path. The NC last disposed at the row represents the NC disposed farthest from the DCL. The fact that an NC disposed at an even-numbered row is connected with an NC disposed at an odd-numbered row through the chaining path means that the NC disposed at the even-numbered row receive data from the NC disposed at the odd-numbered row, and then transfer it to a neighboring NC.

Thus, an NC last disposed at an odd-numbered row may be operated to transfer data input from a neighboring NC that is disposed at the same row to the NC last disposed at an even-numbered row. Further, the NC last disposed at an even-numbered row can be operated to receive data from the NC last disposed at the previous odd-numbered row and to transfer it to a neighboring NC disposed at the same row.

If necessary, one or more chaining paths may be formed in the data processing array unit 30'.

When two or more chaining paths are formed per two row units, the NC first disposed in the even-numbered row (the NC closest to the DCL) may be operated to transfer data input from the third direction (e.g., a left direction opposite to the first direction in the right direction), which is opposite to the first direction, that is, data that is input from the neighboring NC in the third direction of the same row to the NC first disposed at the next odd-numbered ((i+1)-th) row. The first disposed NC in the next odd-numbered ((i+1)-th) row may be operated to receive the data from the first disposed NC of the previous even-numbered (i-th) row and transfer it the neighboring NC in the first direction of the same row.

Each NC, based on the input instruction, may receive and transfer data as above, and perform computation on the data. Each NC performs computation on any input data according to the input instruction, and transfers any other input data to a neighboring NC.

In the data processing array unit 30' of the neural network computing device 1 having such a structure, the chaining path may be selectively formed according to the type of the neural network. For example, a chaining path is not formed during computation for the convolution layer, and a chaining path is formed during computation for the FCL.

Here, for convenience, 4 DCUs 10, 4 DCUs 20 and 16 NCs 31 are used in FIG. 2, but the present invention is not limited thereto.

Based on this structure, the operation of the neural network computing device 1 according to the second exemplary embodiment of the present invention will be described referring to FIG. 2.

When performing a computation for the FCL, a chaining path is formed, but the present invention is not necessarily limited thereto.

For example, FIG. 2, a chaining path 331 may be formed between the NC (31*a* in FIG. 2) last disposed at the odd-numbered first row and the NC (31*b* in FIG. 2) last disposed at the even-numbered second row. A chaining path 332 may be formed between the NC (31*c* in FIG. 2) last disposed at the odd-numbered third row and the NC (31*d* in FIG. 2) last disposed at the even-numbered fourth row.

For computation on the FCL neural network, the data for the N matrix (first input data) is stored in one DCL (e.g., DCL 0), and the data corresponding to each kernel of M (c) (second input data) is stored in the DCU 20 and/or the NCB 32, respectively. Here, the DCL1, the DCL2, and the DCL3 do not operate.

In this state, the first input data from DCL 0 is transferred in the right direction (the first direction) through the NCs of the first row along the first dimension and the last NC 31*b* of the second row receives and transfers the data from the last NC 31*a* of the first row to the input. Thus, the data transferred along the NCs of the first row is provided to the last NC 31*b* of the second row via the chaining path 331, and then is transferred in the left direction (third direction) along the first dimension through the last NC 31*b* of the second row.

The data transferred in the left direction along the first dimension through the last NC 31*b* of the second row is then transferred to the first NC 31*c'* of the third row through the first NC 31*b'* of the second row, and the data transferred to the first NC 31*c* of the third row is moved in the first direction along the first dimension. Thereafter, the data moved in the right direction along the first dimension through the first NC 31*c'* of the third row is transferred to the last NC 31*d* of the fourth row through the chaining path 332 by the last NC 31*c* of the third row. The data transferred to the last NC 31*d* moves along the first dimension in the left direction (third direction) and moves to the first NC 31*d'* of the fourth row. As above, the data input from DCL 0 may be processed through all the NCs of the data processing array unit 30 along the first dimension via chaining paths 331 and 332 which are formed by two row units.

Each NC 31 computes the first input data input from the first direction or the third direction and the data (data input from the DCU 20 or data from the NCB) input along the second dimension and stores the computation result. The computation result of each NC can be cumulatively processed and subsequently sequentially output to the DCL 0.

According to the second exemplary embodiment of the present invention, each NC of the neural network computing device 1 having a systolic array structure is used for computation of the convolution layer widely used for vision processing and image recognition, and all NCs can also be used efficiently for the computation of the FCL. As a result, the utilization rate of the neural network computing device 1 having a systolic array structure is improved. In addition, a large matrix computation can efficiently perform convolution computation and FCL computation while optimizing memory access time and computation time.

In an exemplary embodiment of the present invention, instructions for controlling the operation of each NC may be provided to each NC by a controller (e.g., a flow controller (FC), not shown). For example, an NC last disposed at an even-numbered row may determine whether to receive data from the NC last disposed at the previous odd-numbered row, depending on the instruction being entered.

Figure 3:
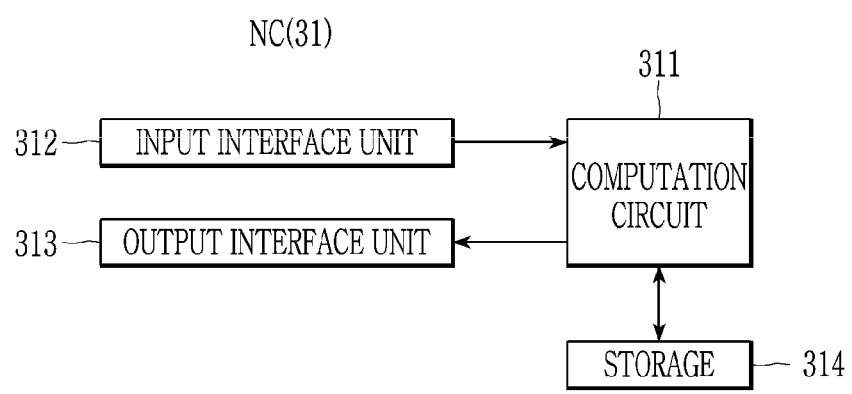
FIG. 3 shows a structure of the NC according to an exemplary embodiment of the present invention.

FIG. 3 shows the structure of the NC according to another exemplary embodiment of the present invention.

As shown in FIG. 3, an NC 31 according to another exemplary embodiment of the present invention includes a computation circuit 311 for performing a computation, an input interface unit 312, an output interface unit 313, and a storage 314.

The input interface unit 312 may be configured to provide data for computation to the computation circuit 311. For example, the input interface unit 312 may be configured to provide first input data from the DCL, which is the first data input processor, and second input data from the DCU, which is the second data input processor, to the computation circuit 311.

The computation circuit 311 may be configured to perform computation described referring to FIGS. 1 and 2, as above. The computation circuit 311 may be configured to perform computation according to an instruction input through the input interface unit 312. The computation circuit 311 may perform the computation of the first input data and the second input data according to the inputted instruction, or may output the first input data or the second input data through the output interface unit 313 to be transmitted to the other NC.

The storage 314 may be configured to store a computation result of the computation circuit 311, and may be configured in a register form, for example. The computation result is the accumulated resulting value of the computations performed by the computation circuit 311.

The output interface unit 313 may be configured to output data from the computation circuit 311. For example, the output interface 313 may output the first input data or the second input data from the computation circuit 311 so that the first input data or the second input data is transferred to the other NC. In addition, the output interface unit 313 may be configured to output the computation result stored in the storage 314.

According to the embodiments of the present invention, it is possible to provide a neural network computing device capable of being reorganized according to a layer type of a neural network. Thus, the reorganized systolic array structure can be used to the full extent for the FCL as well as a convolution layer.

In addition, large matrix computation can be used to efficiently perform convolution computation and FCL computation while optimizing memory access time and computation time.

Exemplary embodiments of the present invention may be implemented through a program for performing a function corresponding to a configuration according to an exemplary embodiment of the present invention and a recording medium with the program recorded therein, as well as through the aforementioned apparatus and/or method, and may be easily implemented by one of ordinary skill in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computing device for performing computation on a neural network, the computing device comprising:
   a data processing array having a systolic array structure and comprising a plurality of cells, wherein each cell is disposed at positions corresponding to a row and a column of the data processing array and each cell comprises a neural core and a buffer;
   wherein cells in a first column of the data processing array are configured to receive respective first input data for a layer of the neural network; and
   wherein cells in a first row of the data processing array are configured to receive respective second input data for the layer of the neural network,
   wherein the neural cores of the cells are each configured to transfer the first input data to a neural core of an adjacent cell in the same row and to transfer the second input data to a neural core of an adjacent cell in the same column,
   wherein the buffers of the cells are each configured to transfer the second input data to a neural core of that cell and to a buffer of the adjacent cell in the same column,
   wherein one or more chaining paths are formed by configuring one or more of the plurality of cells to transfer the first input data from a neural core of a cell of the first row of the data processing array to a neural core of a cell of a second row,
   wherein the neural cores of the cells of the first row, except a cell which is last disposed at the first row, are each configured to transfer the first input data only in a first direction,
   wherein the neural cores of the cells of the second row are each configured to transfer the first input data in a second direction opposite the first direction when the first input data is transferred to the neural core of the cell of a second row through one of the one or more chaining paths, and
   wherein the neural cores of the cells of the second row are each configured to transfer the first input data in the first direction when the first input data is not transferred to the neural core of the cell last disposed at the second row from the neural core of the cell last disposed at the first row.

2. The computing device of claim 1, wherein the chaining path is formed depending on a type of a layer of the neural network.

3. The computing device of claim 1, wherein the chaining path is formed when performing a computation on a fully-connected layer (FCL).

4. The computing device of claim 3, further comprising a plurality of first data input processors configured to respectively provide the first input data to the cells in the first column,
wherein a first data input processor corresponding to the first row of the data processing array among the plurality of first data input processors operates only while remaining first data input processors of the plurality of first data input processors do not operate.

5. The computing device of claim 4, wherein
the first input data input from the first data input processor corresponding to the first row of the data processing array is transferred to all of the cells of the processing array via chaining paths when the chaining paths are formed by two row units in the data processing array.

6. The computing device of claim 1, wherein
a chaining path is formed between a neural core of a cell which is last disposed at an even-numbered row of the data processing array and a neural core of a cell which is last disposed at a previous odd-numbered row of the data processing array.

7. The computing device of claim 1, wherein
the second row is an even-numbered row of the data processing array,
the first row is an odd-numbered row of the data processing array, and
a chaining path of the one or more chaining paths is formed by a cell which is last disposed at the second row determining to receive the first input data transferred from the neural core of a cell which is last disposed at the first row according to an input instruction.

8. The computing device of claim 7, wherein
a cell last disposed at a row is a cell disposed farthest from a cell disposed at the row in the first column.

9. The computing device of claim 7, wherein
a neural core of a cell which is first disposed at an even-numbered row of the data processing array is configured to transfer the first input data input from a neural core of a neighboring cell of the even-numbered row to a neural core of a cell which is first disposed at a next odd-numbered row of the data processing array when a plurality of chaining paths are formed.

10. The computing device of claim 9, wherein:
a cell first disposed at a row is a cell which is disposed in the first column.

11. The computing device of claim 1, wherein
each neural core is configured to perform a computation using the first input data and the second input data, and to accumulate and store the results of the computation.

12. The computing device of claim 11, wherein the neural core comprises:
a computation circuit configured to perform the computation using the first input data and the second input data;
and wherein the neural core is configured to:
accumulate and store the computation results of the computation circuit;
transfer the first input data and the second input data to the computation circuit;
transfer the first input data from the computation circuit to a first other neural core; and
transfer the second input data to a second other neural core.

13. The computing device of claim 1, wherein the one or more chaining paths are formed between a neural core of a cell last disposed at the first row and a neural core of a cell last disposed at the second row by configuring the cell last disposed at the first row to transfer the first input data produced by the neural core of the cell last disposed at the first row to the neural core of the cell last disposed at the second row and configuring the cell last disposed at the second row to receive the first input data by the neural core of the cell last disposed at the second row.

14. A computing device for performing computation on a neural network, comprising:
a data processing array having a systolic array structure and comprising a plurality of cells, wherein each cell is disposed at positions corresponding to a row and a column of the data processing array and is configured to receive first input data input from a row direction and to receive second input data input from a column direction,
the second input data corresponding to a layer of the neural network,
wherein each cell comprises a neural core and a buffer, wherein the neural core of the cell is configured to transfer the first input data to a neighboring operator on the same row and to transfer the second input data to a neural core of a neighboring cell on the same column, and the buffer of the cell is configured to transfer the second input data to a buffer of the neighboring cell on the same column and to the neural core of the cell,
a neural core of a cell last disposed at a first row of the data processing array is configured to transfer the first input data to a neural core of a cell last disposed at a second row,
wherein the neural cores of the cells of the first row, except a cell which is last disposed at the first row, are each configured to transfer the first input data only in a first row direction,
wherein the neural cores of the cells of the second row are each configured to transfer the first input data in a second row direction opposite the first row direction when the first input data is transferred to the neural core of the cell last disposed at the second row from the neural core of the cell last disposed at the first row, and
wherein the neural cores of the cells of the second row are each configured to transfer the first input data in the first row direction when the first input data is not transferred to the neural core of the cell last disposed at the second row from the neural core of the cell last disposed at the first row.

15. The computing device of claim 14, wherein
a neural core of a cell which is last disposed at an even-numbered row of the data processing array is configured to receive the first input data from a neural core of a cell which is last disposed at a previous odd-numbered row, according to an input instruction.

16. The computing device of claim 14, wherein each neural core is configured to perform a computation using the first input data and the second input data, accumulate and store the results of the computation, and output the cumulated computation result to a first data input processor in a row direction.

* * * * *